UNITED STATES PATENT OFFICE.

JAMES SCOTT, OF SHARPSBURG, PENNSYLVANIA.

IMPROVEMENT IN LUBRICATING COMPOUNDS.

Specification forming part of Letters Patent No. 156,714, dated November 10, 1874; application filed October 10, 1874.

*To all whom it may concern:*

Be it known that I, JAMES SCOTT, of Sharpsburg, in the county of Allegheny and State of Pennsylvania, have invented a new and valuable Improvement in Lubricating Compounds; and I do hereby declare that the following is a full, clear, and exact description of the same.

My invention relates to lubricating compounds; and consists in the novel combination of the substances hereinafter mentioned in the manner specified.

I take thirty parts of grease of any suitable character, five parts sal-soda, five parts borax, five parts kaolin, ten parts water, six parts flowers of sulphur, fifteen parts plumbago, ten parts resin, five parts linseed or other oil, five parts powdered elm-bark, five parts liquor of ammonia, and mix the compounds, as hereinafter specified.

I dissolve and heat the grease to about 175° Fahrenheit; then dissolve the sal-soda, kaolin, borax, and resin in seven parts of water, adding, when dissolved, the plumbago and flowers of sulphur and the grease, stirring it thoroughly, and increasing the temperature to about 240°. The powdered elm-bark, having been previously dissolved in about three parts of water, is then added. I continue the boiling about one hour; then put in the oil and ammonia and stir the mixture thoroughly; I then remove it from the fire and continue the agitation until cool.

The proportions herein mentioned may be varied somewhat without material injury to the compound.

What I claim as my invention is—

The lubricating compound consisting of sal-soda, borax, kaolin, water, flowers of sulphur, plumbago, resin, oil, elm-bark, and liquor of ammonia, compounded in the proportions and manner substantially as specified.

In testimony that I claim the above I have hereunto subscribed my name in the presence of two witnesses.

JAMES SCOTT.

Witnesses:
    P. KEIL, Jr.,
    H. J. McGIVEN.